Dec. 4, 1951  P. H. DEMING ET AL  2,577,701
FRACTIONATION PROCESS
Filed May 20, 1946  3 Sheets-Sheet 1
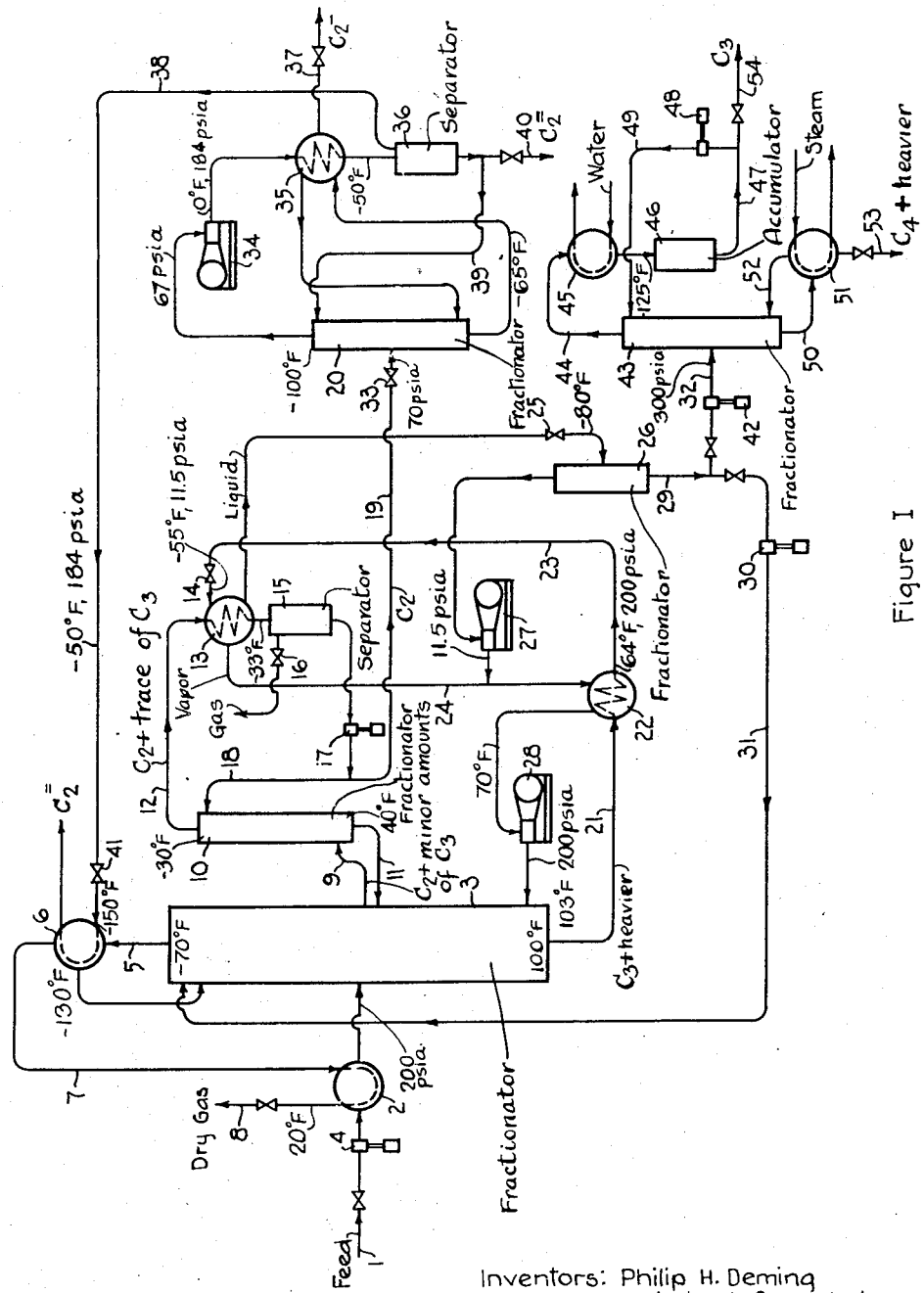
Figure I
Inventors: Philip H. Deming
Malcolm L. Sagenkahn
By their Attorney: James Todorovic

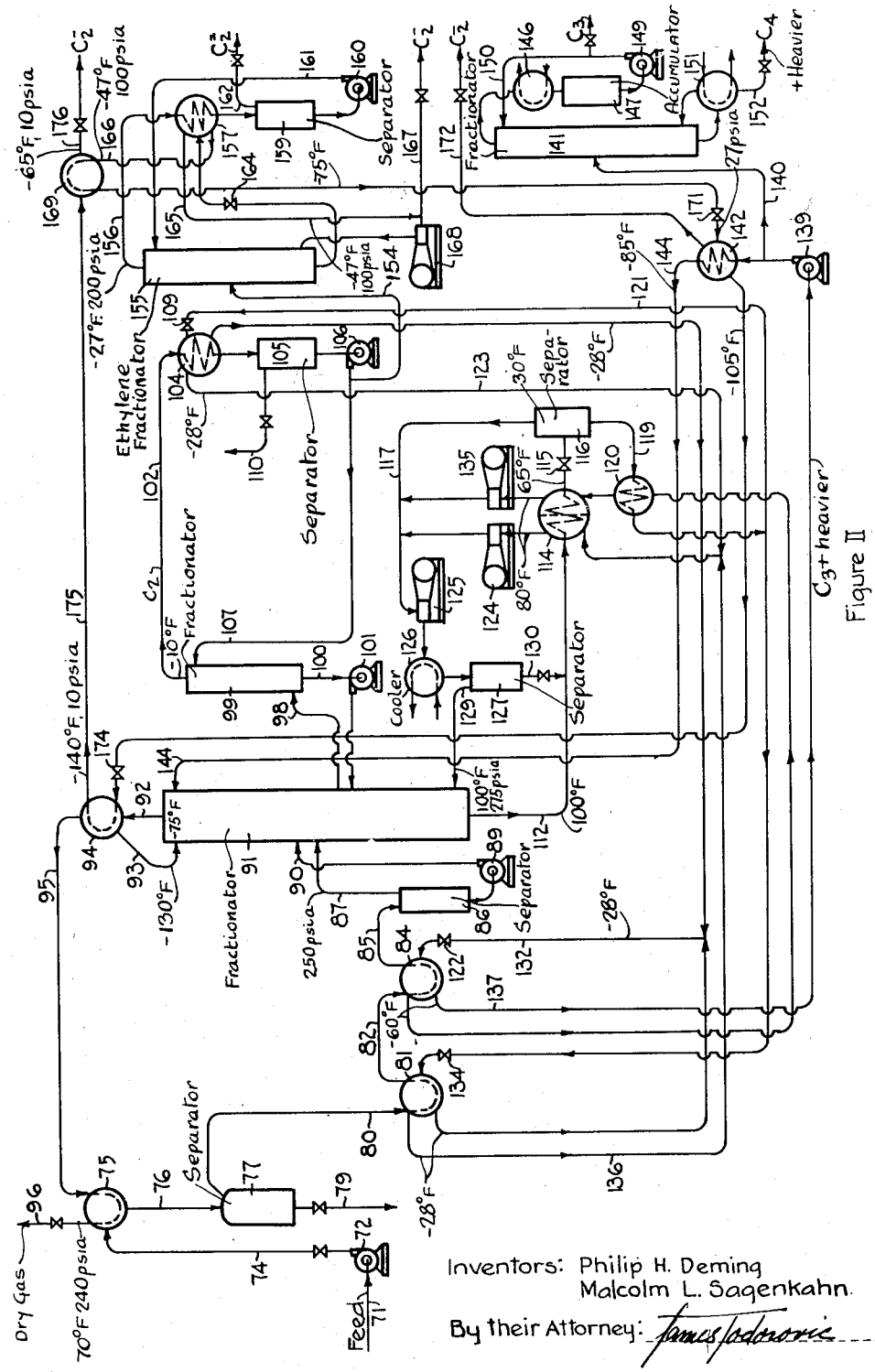

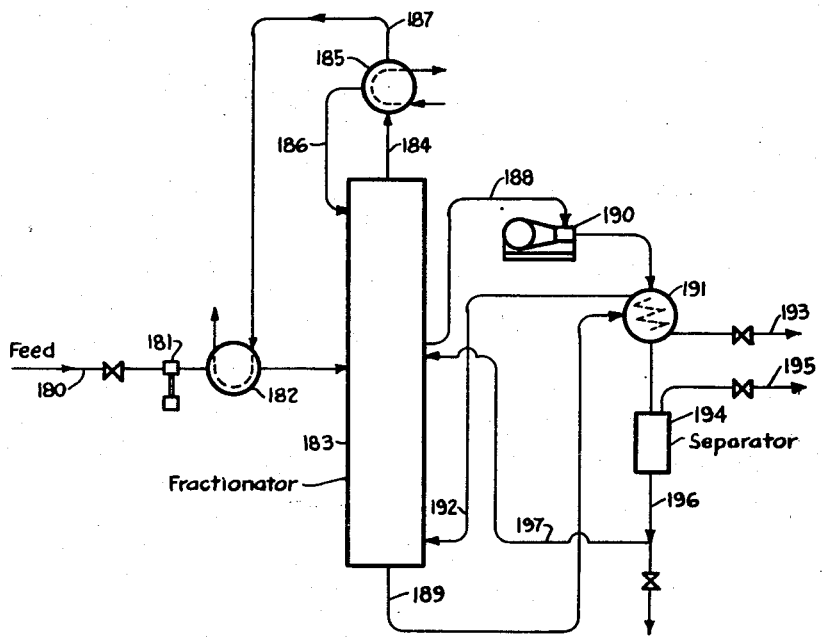
FIG. III
Inventors: Philip Harvey Deming
Malcolm Lee Sagenkahn
By Their Attorney:

Patented Dec. 4, 1951

2,577,701

UNITED STATES PATENT OFFICE 2,577,701

FRACTIONATION PROCESS

Philip Harvey Deming and Malcolm Lee Sagenkahn, San Francisco, Calif., assignors to Shell Development Company, San Francisco, Calif., a corporation of Delaware Application May 20, 1946, Serial No. 670,941

10 Claims. (Cl. 62—175.5)

1

This invention relates to a process of separating fluid mixtures comprising components having close boiling points. More particularly, it relates to a process of separating the components of a fluid mixture of hydrocarbons, such as mixtures comprising the lower molecular weight hydrocarbons, as, for example, hydrocarbons having one to five carbon atoms per molecule, which hydrocarbons may be both olefin and paraffins, and which mixture may also contain hydrogen and/or nitrogen.

It is an object of the invention to provide an efficient process for separating ethylene from a hydrocarbon gas mixture containing principally hydrogen, methane, ethylene, ethane, propylene, propane, butanes and butylenes. It is a further object to separate such a gas mixture into a substantially dry gas fraction, a propane-propylene fraction and an ethane fraction. A still further object of the invention is to effect economies and achieve high efficiencies in such separations by utilizing mechanical energy for transferring heat energy from one stage of the process to another stage. Still other objects will be apparent from the hereinafter given description of the invention, with particular reference to the drawings representing preferred embodiments of the invention.

Now, in accordance with the present invention, a fluid mixture of normally gaseous substances, such as lower molecular weight hydrocarbons, is subjected to a first fractionation into a lightest fraction, a heaviest fraction and an intermediate fraction. Each of the three fractions is subjected to further separations into lighter and heavier portions by operations involving at least partial condensation of overheads with partial reflux return thereof and at least partial vaporization of bottoms with partial reboiling return thereof and heat exchange between overheads and bottoms and utilizing mechanical energy in combinations effecting a heat energy transfer from an overhead vapor fraction to a fractionator bottoms portion with simultaneous return of a vaporized and heated bottoms portion for stripping purposes.

Having set forth the invention in a general manner, there follows now a detailed description of three examples of the invention with particular reference to the accompanying drawings which are illustrative but not limitative of the invention, wherein Figs. I, II and III are schematic flow diagrams of certain embodiments of the present invention as applied to separating a refinery gas mixture of hydrogen and low molecular weight hydrocarbons into desirable fractions of the individual constituents thereof. Pressures, temperatures and compositions indicated by legends on the drawing describe merely one of many possible operating conditions. Symbols $C_2$, $C_3$, etc., denote hydrocarbons containing two, three, etc., carbon atoms in the molecules, respectively, including saturated and unsaturated hydrocarbons; a single line following a symbol (e. g., $C_2$—) denotes a saturated hydrocarbon, and double lines (e. g., $C_2$=) denote an unsaturated hydrocarbon.

Referring to Figure I of the drawings, a stream of gases comprising fixed gases such as hydrogen and methane and $C_2$ and $C_3$ hydrocarbons, including both olefins and paraffins, such as may be obtained in thermal and/or catalytic cracking processes employed for the conversion of petroleum hydrocarbons, is introduced to the system by means of a valved line 1. The stream of gases is passed through a heat exchanger 2 wherein it is precooled by heat exchange with colder, unliquefied hydrogen and methane overhead from fractionation of a previous portion of the gas stream. The gas stream is then delivered to a fractionator 3 wherein the conditions of pressure and temperature are maintained at the values necessary to effect a proper or desirable separation of the gaseous stream into an overhead which contains substantially all the hydrogen and methane (together with a small amount of the ethylene) present in the gas stream, a bottoms condensate containing substantially all the propane and propylene, together with heavier gases such as butanes and butylenes which may be present in minor proportions, and an intermediate portion containing substantially all the ethylene and ethane and a minor proportion of the propylene present in the gas stream. This separation may be accomplished, for example, by maintaining the fractionator 3 at a pressure of about 200 pounds per square inch absolute (p. s. i. a.) and a temperature of about —70° F. at the top of the fractionator and of about 100° F. at the bottom of the fractionator. The proper pressure may be maintained by means of a compressor 4 in the line 1 ahead of the heat exchanger or cooler 2.

The overhead gases from fractionator 3 are withdrawn through a line 5, cooled and partially condensed by heat exchange in a cooler 6, and the condensed portion of the overhead is returned to an upper portion of the fractionator as reflux, while the uncondensed portion comprising essentially the hydrogen and methane of the gas stream is passed through a line 7 to heat exchanger 2 where it is used to cool the incoming feed. This partial liquefaction of the overhead gases is accomplished by cooling them in the cooler 6, e. g., to a temperature of about −130° F. After passing through the heat exchanger 2, the effluent gas is at a temperature of about 20° F. and is made up largely of hydrogen and methane. It is discharged from the system thus as a dry gas by means of a valved line 8.

A fraction of the material of the gas stream is withdrawn from an intermediate portion of the fractionator 3 by means of a suitable line 9 and delivered to a fractionating column 10 from which a bottoms fraction is withdrawn and returned by line 11 to the fractionator 3, preferably at a point slightly below the withdrawal point of the intermediate fraction. An overhead fraction is withdrawn from the fractionating column 10 by means of a line 12. The fractionating column 10 may be operated at a pressure of about 200 p. s. i. a. and a top temperature of about −30° F. with a bottom temperature of about 40° F. The overhead withdrawn through line 12 is made up substantially of the ethylene and ethane ($C_2$) contents of the gaseous stream, together with a trace of propylene. Substantially all of the propylene content of the intermediate fraction withdrawn from the fractionator 3 is separated as condensate in the column 10 and returned to the fractionator through line 11.

The ethylene-ethane overhead from column 10 is refrigerated in a heat exchanger 13 by heat exchange with $C_3$ condensate withdrawn from the bottom of fractionator 3 which is expansion-cooled by means of a suitable expansion valve 14 sufficiently to provide a downward temperature gradient from the ethylene-ethane overhead to the expansion-cooled $C_3$ fractionator-bottoms fraction. The condensation of the ethylene and ethane may be effected in this manner at about 200 p. s. i. a. pressure by reducing the temperature of the refrigerant (bottoms fraction) to about −33° F. through expansion to a pressure below 200 p. s. i. a. The thus refrigerated overhead material from column 10 is delivered to a separator 15 from which uncondensed lighter gases are vented by means of valved line 16. A portion of the liquefied material is pumped by means of a pump 17 and line 18 to the column 10 as reflux, and the remainder of the liquefied portion is delivered by means of a line 19 to an ethylene fractionator 20.

In providing the refrigerant for the ethylene-ethane overhead from column 10, the heaviest fraction of the feed separated in the fractionator 3 is withdrawn from the bottom of the fractionator 3 by means of a line 21, cooled in a heat exchanger 22 by heat exchange with a previously expansion-cooled bottoms portion, the precooled liquid bottoms is delivered by means of a line 23 to an expansion valve 14, which may be replaced by an expansion engine if desired, and allowed to expand in or through the expansion valve (or engine) with a resultant lowering of the temperature thereof and partial vaporization of the bottoms fraction to form both a vapor phase and a liquid phase, this vaporization effecting a partial separation of lighter components from heavier components of the bottoms fraction.

The resulting expansion-cooled bottoms fraction, made up of vapor and liquid phases, is flowed in heat exchange in the heat exchanger 13 with the above-mentioned ethylene-ethane overhead fraction to liquefy it. The ethylene-ethane content of the overhead is thus condensed to the liquid state, the heat of liquefaction being transferred to the expansion-cooled bottoms fraction liquid phase and resulting in further vaporization thereof. The remaining liquid phase of the bottoms fraction is then delivered through an expansion valve 25 to a fractionator 26, from which is withdrawn an overhead vapor phase. The overhead vapor phase is compressed by a compressor 27, thus being simultaneously compression-heated, and then combined with the vapor phase of the bottoms fraction withdrawn from heat exchanger 13 by means of a line 24. The combined vapor phase from the bottoms fraction, which now contains the heat of liquefaction of the ethylene-ethane overhead from the fractionating column 10, is used in heat exchanger 22 to precool a following bottoms fraction, the vapor phase thus being further enriched with heat energy. It is then compressed by means of a compressor 28 and simultaneously compression heated, and then returned to a lower section of the fractionator 3 where it functions as a reboiling and a stripping agent.

The process of abstracting heat from and condensing the $C_2$ overhead vapors from fractionating column 10 and thus providing reflux for the top of that column, and adding said abstracted heat to the $C_3$ bottoms fraction from fractionator 3 to provide reboiling and stripping heat energy for fractionator 3, is accomplished in this embodiment of the invention by a co-ordinated sequence of operations designed to effect a heat flow external of the column from overhead to bottoms. In order to effect the heat flow it is necessary that the bottoms fraction be cooled to a temperature lower than that of the overhead. The following combination of conditions has been found to be particularly effective in accomplishing this energy transfer. The $C_3$ fractionator bottoms fraction is withdrawn from the fractionator 3 at a temperature of about 100° F., precooled in heat exchanger 22 to about 64° F., and expansion cooled in expansion valve or engine 14 to a temperature of about −55° F. and a pressure of about 11.5 p. s. i. a. The $C_2$ overhead fraction, at a temperature of about −30° F. and under a pressure of about 200 p. s. i. a., is cooled to about −33° F. by heat exchange with the expansion-cooled $C_3$ bottoms fraction, thus liquefying the ethane and ethylene contained in the overhead fraction. A further portion of the bottoms liquid phase is thus vaporized by the heat of liquefaction of the $C_2$ overhead. The remaining bottoms liquid phase is then expanded through valve 25 and thereby expansion cooled further to a temperature of about −80° F., a vapor phase is separated therefrom at the top of fractionator 26 and compressed to about 11.5 p. s. i. a. pressure in compressor 27 and then combined with the bottoms vapor phase withdrawn from exchanger 13. The combined vapor phase is used to precool the $C_3$ bottoms fraction in exchanger 22 and thus is itself heated to about 70° F.; it is then compressed to about 220 p. s. i. a. pressure in compressor 28 and compression heated to about 103° F., any additional heat of compression being removed by suitable external cooling means (not shown). Thus, the bottom fraction which is compressed in compressor 28 may be cooled to abstract heat, in the manner shown in Fig. 11, wherein a cooler 126 is shown for this purpose.

Operating the process in accordance with the described conditions makes it possible to simultaneously withdraw the C₂ overhead with about 5.8 units of heat energy content and the C₃ bottoms fraction with about 15.9 units of heat energy content, transfer 4.6 of the heat units from the C₂ overhead to the C₃ bottoms, effect a further separation of the bottom fraction components, and return 17.1 units of heat energy to the fractionator bottom in only a portion of the bottoms fraction with the use of only about 7.4 energy equivalent units of mechanical work.

The liquid separated in fractionator 26, which liquid is largely or primarily the withdrawn propane-propylene content of the gas stream, together with any higher hydrocarbons (the C₃+ fraction), is withdrawn by means of a line 29. A part of this liquid fraction is delivered by means of a pump 30 in a valved line 31 to the top of the fractionator 3 where it serves as an absorber for substances of molecular weights higher than methane. The other part of the withdrawn fraction is delivered by means of a pump 42 in a valved line 32 to a fractionating tower 43 for the separation of the C₃ and C₄ constituents thereof.

The portion of the liquefied C₂ overhead from the fractionating column 10 which is not returned as reflux to the column 10, is delivered to the fractionator 20, after having been expansion-cooled by passing through an expansion valve 33, with a drop in pressure to about 70 p. s. i. a. The thus cooled ethane-ethylene fraction is fractionated in the fractionator 20 into (1) an ethylene overhead fraction containing substantially all the ethylene of the gas stream together with a portion of the ethane and (2) an ethane bottoms fraction. The ethylene overhead fraction, which is at a pressure of about 67 p. s. i. a. and a temperature of about −100° F., is compression-heated by means of a compressor 34 to a pressure of about 184 p. s. i. a. and a temperature of about 0° F., and then flowed through a heat exchanger 35 in heat exchange with the withdrawn liquid ethane bottoms. The liquid ethane, which is at a temperature of about −65° F., is vaporized at that temperature by heat abstracted from the compression-heated overhead. The vaporized ethane is then returned to the bottom of the tower 20 as reboiling and stripping agent. Any unvaporized ethane is withdrawn by means of a line 37. By the heat exchange from the overhead to the bottoms, the overhead is cooled, with partial liquefaction, to a temperature of about −50° F. The thus cooled overhead is delivered to a separator 36 from which the unliquefied portion is withdrawn through a line 38 as substantially pure ethylene vapor; a portion of the condensate is returned by means of a line 39 to the top of the tower as reflux; and the remainder of the condensate is withdrawn through a valved line 40 as ethylene having a purity of about 99%.

By this combination of coordinated operations it is possible to effect an economical transfer of energy from the overhead to the bottoms which is initially at a higher temperature than the overhead. Thus, an overhead containing about 4.5 units of heat energy, withdrawn simultaneously with the ethane bottoms containing about 0.4 unit of heat energy, is supplied with about 0.8 unit of heat energy by means of mechanical compression and after indirect heat transfer from overhead to bottoms fraction, about 3.9 units of heat energy is returned to the tower bottom in only a portion of the withdrawn bottoms fraction while only about 1.0 unit of energy is retained in the overhead. In other words, by adding 0.8 unit of energy by mechanical means to the combination, about 4.0 heat units net are removed from the top of the tower, about 3.9 heat units net are supplied to the bottom of the tower and at the same time a substantial separation of relatively pure ethylene is effected. By compression-heating the overhead to raise its temperature above the temperature of the bottoms, a material economy in heat exchanger surface and therefore size and cost thereof is effected, which would not be realized in this instance if the ethane bottoms were expansion-cooled to lower the temperature thereof below that of the overhead. It is feasible at this stage to compression-heat the overhead since the initial overhead pressure is not particularly high, the pressure of the ethylene-ethane fraction from column 10 having previously been reduced to effect cooling and separation by fractionation.

The substantially pure ethylene vapors withdrawn from the separator 36 are at a temperature of about −50° F. and under a pressure of about 184 p. s. i. a. They are delivered by means of the line 38 to an expansion valve 41 through which the ethylene expands to atmospheric pressure with a resultant lowering of the temperature thereof to about −150° F. The thus cooled ethylene is then utilized in cooler 6 as cooling means for effecting the partial condensation of the overhead from the fractionator 3. The expansion valve 41 may be replaced by an expansion engine and the work produced therein by the expanding ethylene may be utilized to supply a portion of the mechanical energy required to operate the compressor 34, thus accomplishing a further economy of energy requirements.

The propane-propylene fraction delivered to the fractionating tower 43 is compressed to a pressure of about 300 p. s. i. a. by means of the pump 42. An overhead fraction is withdrawn from the tower through a line 44 and cooled in cooler 45 to a temperature of about 125° F. and under a pressure of about 300 p. s. i. a. The cooled and condensed material is run to an accumulator 46 from which the liquefied material is withdrawn through a line 47. A portion of the condensate is returned by a pump 48 in a line 49 to the top of the tower for reflux. The remainder of the condensed phase is withdrawn through line 54 as a propane-propylene fraction containing only minor amounts of other hydrocarbons. The material collecting in the bottom of the tower 43 is withdrawn through line 50 to a reboiler 51 wherein it is heated indirectly, e. g., with steam, the resulting bottoms vapor being returned to the tower bottom by means of line 52 and the remaining liquid portion withdrawn through a valved line 53. The withdrawn liquid is substantially only butanes and butylenes with only a minor proportion of the lighter (C₃) hydrocarbons.

The foregoing description of the operation of a process in accordance with the present invention, wherein a continuous process providing for the separation of the constituents of a hydrocarbon gas mixture comprising essentially lower hydrocarbons together with hydrogen has been described in considerable detail, may, as will be understood by one skilled in the art, be modified in many respects without deviating from the scope of the invention.

It will be understood that the various fractionating columns may be of different designs and constructions and that additional heating and/or cooling means may be provided where it is desirable or advantageous to do so both for operation of the fractionating columns and for supplying additional heating or cooling for the different fluid streams. It will be also understood that additional pumps for overcoming pressure differences in fluid lines, suitable valves, vents, traps, etc., will or may be utilized where needed or found desirable.

The C₂ overhead fraction from fractionating column 10 additionally may be compression-heated prior to heat exchange with the expansion-cooled C₃—C₄ bottoms fraction from fractionator 3, similar to the compression-heating of the ethylene overhead from column 20 by compressor 34. However, total advantages gained by reduction in heat exchanger surface requirements resulting from the compression of the ethylene overhead fraction from fractionator 20 whereby the pressure is increased up to about 200 p. s. i. a., do not necessarily result from compressing the 200 p. s. i. a. C₂ overhead from column 10 up to a substantially higher pressure. Any gain due to reduction in heat exchanger surface may be entirely cancelled by increased thickness of vessel walls required to insure safety.

Another embodiment of the invention is illustrated in Figure II of the accompanying drawings, which figure is a schematic flow diagram of a process of separating mixtures comprising low molecular weight hydrocarbons into desirable fractions of the individual constituents thereof.

Referring to this figure, a stream of gases comprising fixed gases, such as hydrogen and methane, and C₂—C₄ (lower molecular weight) hydrocarbons possibly together with small proportions of C₅ hydrocarbons, including both saturated and unsaturated hydrocarbons, for example, a stream of gases which may be obtained by mixing ordinary refinery gases known as thermal dry gas, ethane cracked gas, and catalytically cracked gas, is introduced to the system by means of a suitable feed line 71, pump 72, and valved conduit 74. This stream of gases is passed through a heat exchanger 75 wherein it is precooled by heat exchange with colder, unliquefied fixed gas overhead from fractionation of a previous portion of the gas stream. The precooled stream is then introduced by means of a line 76 into a separator 77, from which any liquefied heavier portion of the mixture is withdrawn by means of a valved line 79. The unliquefied material is then passed, serially through two heat exchangers 81 and 84 by means of lines 80 and 82, respectively, wherein the stream is further precooled by heat exchange with expansion-cooled portions of fractions produced from an earlier portion of the gas stream in accordance with the invention as this will be described hereinafter. The thus cooled feed stream is then delivered by line 85 to a separator 86 from which feed material in the gaseous state is fed by way of line 87 to an intermediate section of a fractionator 91 and from which separator the liquefied portion of the feed material is pumped by means of a pump 89 through line 90 into a section of the fractionator 91 above the section to which the gaseous feed is delivered.

The combined feed delivered to the fractionator 91 is separated therein under suitable conditions of pressure and temperature into an overhead fraction containing substantially all of the hydrogen and methane present in the feed, together with a small amount of ethylene, a bottoms condensate fraction containing substantially all the C₃ and heavier hydrocarbons in the feed delivered to the fractionator, and a fraction taken from an intermediate section of the fractionator containing substantially all of the ethylene and ethane (C₂) and a minor proportion of the propylene (C₃=) present in the feed. This separation may be effected, for example, by maintaining the fractionator 91 at a pressure of about 250 p. s. i. a. and a temperature of about −75° F. in the effluent overhead stream and a temperature of about 100° F. at the bottom of the fractionator, with suitable overhead reflux return and bottom reboiling return.

The overhead fraction from the fractionator 91 is withdrawn through a line 92, cooled and partially condensed by heat exchange in a cooler or heat exchanger 94, and the condensed portion of the overhead returned by line 93 to an upper portion of the fractionator 91 as reflux, while the uncondensed portion comprising essentially the hydrogen and methane (and any nitrogen which may be present) is passed through a line 95 to the heat exchanger 75 where it is used to cool the incoming feed. This partial liquefaction of the overhead fraction to produce reflux liquid is accomplished for example by cooling the overhead to a temperature of about −130° F. under a pressure of about 250 p. s. i. a. The effluent gas is then heated in heat exchanger 75 by heat exchange with incoming feed to a temperature of about 70° F. at a pressure of about 240 p. s. i. a. This gas is then discharged from the system as a dry gas by means of a valved line 96. Alternatively, the overhead fraction may be expansion cooled to a lower pressure and thereby effect a greater cooling of the feed stream in the cooler 75. Furthermore, the overhead stream may be expansion-cooled in an ordinary reciprocating-type expansion engine or in a turbine-type expansion engine to produce either or both the cooling required for the production of reflux for the top of fractionator 91 and the precooling of the feed stream in heat exchanger 75.

A fraction of the feed material is withdrawn from an intermediate section of the fractionator 91 and delivered by means of a suitable line 98 to a fractionating column (a de-ethanizer) 99 from which a bottoms fraction is withdrawn and returned by means of a line 100 and a pump 101 to a lower section of the fractionator 91, while an overhead fraction is withdrawn from this de-ethanizer 99 by means of a line 102. The top effluent temperature of the de-ethanizer is maintained at about −10° F. by cooling the overhead fraction by heat exchange in a condenser 104 to a temperature of about −10° F., thereby partly condensing the overhead, and returning a suitable portion of the condensate as reflux to the top of the de-ethanizer, this being effected by means of a separator 105, a pump 106, and a line 107.

A third fraction (termed a bottoms fraction) of the feed material is withdrawn from a lower section of the fractionator 91 by means of a line 112, cooled by heat exchange in heat exchanger 114, expansion-cooled by passage through expansion valve 115, and delivered to a separator 116 from which vaporized bottoms fraction is withdrawn by means of a line 117, while a further-cooled liquid fraction of the bottoms fractions is withdrawn by means of a line 119. The thus cooled fraction of the bottoms fraction is still further cooled by heat interchange in heat exchanger 120, and then divided into first and second portions. The first portion is delivered via line 121 to expansion device 109, such as an expansion valve or an expansion engine, where it is allowed to expand sufficiently to provide a downward temperature gradient from the ethylene-ethane overhead to the thus expansion-cooled first portion of bottoms fraction. By this means sufficient refrigeration is provided for the ethylene-ethane overhead from the de-ethanizer 99. Uncondensed gases lighter than ethylene are vented from separator 105 by means of a valved line 110. For most efficient heat recovery the expansion cooling is just sufficient to give the required temperature gradient and so that refrigeration will be by means of heat of vaporization.

The vaporized portion of the bottoms fraction produced in expansion device 109 and condenser 104 is withdrawn via line 123 and further enriched with heat energy by heat exchange with a following portion of bottoms from fractionator 91 in heat exchange 114, compressed in compressor 124, and combined with the vaporized portion of bottoms in line 117. This mixture is then compressed in compressor 125, suitably cooled in cooler 126, and separated into condensate and vapor in separators 127, the vapor being returned via line 129 to a lower section of fractionator 91 as reboiling means, while the condensate is combined by means of valved line 130 with a following portion of withdrawn bottoms.

The unvaporized and expansion-cooled part of the first portion of bottoms fraction produced in expansion device 109 and condenser 104 is combined in line 132 with a similarly unvaporized and expansion-cooled part of the second portion of the bottoms fraction, produced by passage through an expansion valve 134 and heat exchanger 81, and the combined material is expansion-cooled in expansion valve 122 to provide cooling means in heat exchanger 84 for the incoming feed. The resulting vaporized portion of bottoms from heat exchanger 84 is heated by heat interchange with a subsequent portion of bottoms in heat exchangers 120 and 114, suitably compressed in compressor 135, combined with the vaporized portion of bottoms in line 117, and returned together therewith to the fractionator 91 as reboiling means as described previously. The resulting vaporized part of the second portion of bottoms fraction produced by means of expansion valve 134 and heat exchanger 81, is withdrawn therefrom by line 136, combined with the vapors withdrawn from condenser 104 through line 123, and subsequently returned to the fractionator bottom as reboiling means as described heretofore.

By means of these unitary and correlated expansion-cooling operations and heat interchanges the lighter portions of the withdrawn fractionator bottoms are effectively separated from the heavier portions, while at the same time pre-cooling of the feed material is accomplished, refrigeration of the ethylene-ethane overhead from the de-ethanizer is provided, recovered energy is supplied to the fractionator for reboiling means, and stripping gases are produced and delivered to the fractionator.

The portion of the bottoms fraction which remains unvaporized throughout the operations described hereinbefore is withdrawn from the heat exchanger 84 by means of line 137, and delivered to pump 139, from which a portion is delivered by line 140 to a propylene fractionator 141 for the separation of $C_3$ and $C_4$ fractions. The remainder of the unvaporized material is further cooled by heat interchange, for instance in a heat exchanger 142 and delivered therefrom by means of line 144 to an upper section of fractionator 91 to function as lean oil therein to effect absorption of $C_2$ hydrocarbons from the fixed gases. Thus, this process also effectively provides lean oil for absorption in the upper section of fractionator 91, along with the other provisions enumerated above.

The above operations and the indicated economies may be suitably effected in the following manner: Referring again to Figure II, a bottoms fraction is withdrawn at about 100° F., cooled to about 65° F. in heat exchanger 114, and expansion cooled in expansion device 115 to a temperature of about 30° F. Liquid at about 30° F. is withdrawn from separator 116, further cooled in heat exchanger 120, and divided into first and second portions; the first portion is expansion-cooled in expansion device 109 and, after being used as refrigerating means in condenser 104, is withdrawn therefrom as separate vapor and liquid fractions at about —28° F. The second portion of the precoooled bottoms fraction is expansion cooled in expansion device 134, is used to precool feed in exchanger 81 and then withdrawn therefrom as separate vapor and liquid fractions at about —28° F. The liquid or unvaporized fractions from exchangers 104 and 81, at a temperature of about —28° F. are combined and expansion-cooled in device 122, utilized to produce further precooling of feed in exchanger 84 and withdrawn from exchanger 84 as separate vapor and liquid fractions at about —60° F. The vapor fractions from exchangers 104, 84 and 81 are used as precooling means for a fractionator bottoms portion and thereby are heated to about 80° F. in exchangers 120 and 114. After suitable subsequent compression, such as by means of compressors 124, 135 and 125, suitably cooling in cooler 126 to remove any undesirable and excess heat, mixing with vapor fraction from separator 116, and separation of condensate, the resulting heated and compressed vapor stream is delivered to the bottom of fractionator 91 at about 100° F. and a pressure of 275 p. s. i. a. The liquid (unvaporized) portion of bottoms fraction which is withdrawn from exchanger 84 at about —60° F., is divided into two portions. One portion is further cooled in exchanger 142 to about —85° F. and delivered at that temperature to the top of fractionator 91 as lean oil. This fraction comprises essentially the $C_3$ and $C_4$ hydrocarbons. The remainder is fractionated in propylene fractionator 141 into a propylene-propane fraction containing about 10% ethane, and a butane-pentane fraction. For this separation, the overhead condensation and the reflux return are provided by conventional water-cooled condenser 146, accumulator 147, pump 149, and reflux return line 150. Reboiling is provided by a suitable reboiler 151, a $C_4$—$C_5$ fraction being withdrawn by means of a valved line 152.

Returning to the separation of the ethylene fraction, the portion of the ethylene-ethane condensate collected in accumulator and separator 105 which is not returned as reflux to de-ethanizer 99 is delivered by means of pump 106 and line 154 to an ethylene fractionator 155 wherein it is fractionated into an overhead ethylene fraction and a bottoms ethane fraction. The overhead is withdrawn through line 156, refrigerated and partially condensed in condenser 157, and separated in separator and accumulator 159 into a condensate fraction which is withdrawn therefrom and returned to the top of fractionator 155 by means of pump 160 and line 161, and into a gaseous fraction which is substantially completely composed of C₂ hydrocarbons, about 95% of which is ethylene while the remainder is substantially pure ethane. This ethylene fraction is withdrawn by means of a valved line 162. The bottoms fraction from the ethylene fractionator is expansion-cooled in expansion device 164 to give a small downward temperature gradient from the overhead in line 156 to the thus expansion-cooled bottoms, and it is then used in condenser 157 as condensing means for at least a portion of the overhead. The bottoms fraction is thus separated into two separate fractions, a vaporized fraction which is withdrawn from condenser 157 by line 165, and a liquid (unvaporized) fraction which is withdrawn by line 166. A portion of the vaporized fraction is compressed in a compressor 168 back up to the pressure in fractionator 155 and consequently at the same time heated (by compression) and then returned to the bottom of the fractionator as reboiling means as well as stripping agent for the material in the lower section of the fractionator. The remainder is withdrawn through valved line 167 as a substantially 95% ethane fraction. The unvaporized part of the bottoms fraction in line 166 is further cooled in heat exchanger 169 and then expansion-cooled in expansion device 171 to provide sufficient cooling in exchanger 142 for the lean oil fraction to be returned to the top of fractionator 91. The resulting vaporized part of the ethane fraction from the ethylene fractionator 155 is thus made available in valved line 172. The liquid (unvaporized) part which is withdrawn from the exchanger 142 at a temperature substantially below the −85° F. of the lean oil is further suitably expansion-cooled in device 174 to provide the required cooling and therefore condensation for reflux of overhead from fractionator 91 in cooler 94. The ethane material is then delivered by means of line 175 to exchanger 169 where it serves as precooling means for a subsequent or following portion of the same stream, and it is then made available in valved line 176. Suitable conditions for this series of coordinated operations are as follows: The ethylene fraction is taken overhead from the fractionator 155 at a temperature of about −27° F. at a pressure of about 250 p. s. i. a. The ethane bottoms is expansion-cooled to give vaporized and liquid portions withdrawn from condenser 157, of about −47° F. at about 100 p. s. i. a. The liquid portion is futher cooled to about −75° F in exchanger 169, and expanded to about 27 p. s.i. a. in expansion valve 171. The ethane liquid withdrawn from exchanger 142 is at about 27 p. s. i. a. and −105° F. It is expansion-cooled to about 10 p. s. i. a. in expansion device 174 to give a temperature of about −140° F. in line 175 and a temperature of about −65° F. at 10 p. s. i. a. in line 176.

Any one or all of the fluid streams which are cooled by expansion may be made to do work at the same time by allowing the fluid to expand in an expansion device such as an expansion engine. The useful work which is thus made available may be utilized in connection with the operation of any of the compressions in the process, such as in compressors 27, 28, and 34.

A specific variant is illustrated in Fig. III, wherein the compression heating step is applied to an intermediate instead of to an overhead vapor stream. A multi-component feed stream, such as one of the types previously described, is introduced by a feed line 180, pump 181 and heat exchanger 182 to a fractionating column 183 wherein the conditions of pressure and temperature are maintained at the values neecssary to effect a proper or desirable separation into the following streams: An overhead vapor fraction in which the most volatile component is concentrated, withdrawn through a line 184, which is cooled and partially condensed by heat exchange in a cooler 185 to produce reflux condensate which is returned by line 186 to the upper portion of the fractionator while the uncondensed portion is withdrawn by line 187 and may serve as coolant in heat exchanger 182; an intermediate vapor fraction wherein a component of intermediate volatility is concentrated, withdrawn from an intermediate section by a line 188; and a bottoms fraction, rich in the least volatile component, withdrawn by a line 189. These streams may have composition as previously described for the column 3 or 91. The intermediate vapor fraction is compression-heated by means of a compressor 190 to a temperature above that of the bottoms fraction and then flowed through a heat exchanger 191 in heat exchange with the withdrawn bottoms fraction. Part of the bottoms fraction is vaporized and the vaporized part is returned to the bottom of the column 183 as reboiling agent by a line 192; unvaporized bottoms fraction is withdrawn by line 193. By heat exchange from the intermediate fraction to the bottoms fraction, the former is cooled, with partial liquefaction. The thus cooled intermediate stream is delivered to a separator 194 from which the unliquefied portion is withdrawn through a line 195 and the liquefied portion is withdrawn through a line 196; a portion of the latter is returned by a line 197 to an upper part of the column as reflux.

A process of the character contemplated in the present invention involves a number of variable factors, the proper coordination and correlation of which are essential for economical and efficient operation. Thus, in effecting a transfer of heat energy from a column overhead to a column bottom it is necessary either first to raise the temperature of the overhead so that it is higher than that of the bottoms, or else lower the temperature of the latter to a value below that of the overhead. In utilizing compression-heating and expansion-cooling to effect these temperature changes and then taking advantage of the desirable temperature gradient in the subsequent indirect heat transfer, cognizance must be taken of the relative efficiencies involved in the individual steps and the sum total of the combined operation.

The present invention is thus a coordinated and unitary sequence of operational steps in which overall maximum efficiencies of energy transfer and component separations are accomplished.

It will be understood by one skilled in the art, that the same integrations of operations illustrated in the drawings and described hereinabove may be made in accordance with the invention in the use of various modifications of the embodiments described for the purpose of illustrating preferred methods of operation. Thus, the demethanizer refrigeration and reflux requirements may be supplied in part or completely by the use of a suitable expansion device placed in the fixed gas effluent stream from the demethanizer. For unusually high recovery of the next higher hydrocarbon fraction (ethylene in this case), it has been found that a gas turbine designed for refrigeration purposes, such as the one manufactured by the Elliott Company of Jeanette, Pennsylvania, is especially effective in producing very low temperatures in expanded overhead from the demethanizer, thus providing a lower dew temperature and more complete return of ethylene to the fractionator in the reflux. A further modification is to deliver a precooled, highly compressed, feed to a first high pressure fractionating column, take off as overhead a first fraction of, say, fixed gases effectively rejecting higher material by means of a turbine expander and proper cold exchange, deliver the bottom take-off to a second fractionating column from which is withdrawn a second predetermined, narrow-range, fraction as overhead containing substantially only two components, completely condensing this fraction and separate it into its separate components in a third fractionating column, and deliver the bottoms fraction from the second column to a fourth column for separation of constituents thereof, while at the same time properly coordinating and integrating operations involving compression-heating and/or expansion-cooling of overhead vapors and bottoms liquids, respectively, and effecting appropriate heat interchanges between resulting overhead vapors and bottoms liquids under conditions to minimize the temperature gradient between energy donor and energy acceptor.

Wherever there is an operation in a process in which a mixture consisting essentially of two components having very close boiling points, such as in mixtures of paraffin and olefin hydrocarbons with the same number of carbon atoms, e. g., ethane and ethylene, propane and propylene, etc., is separated by fractionation, the temperature difference between the top and bottom of the fractionator may be kept rather small. In just such cases, it is economically feasible to effect a net energy recovery in the system by effecting thermal energy transfer from the overhead stream to the bottoms stream external of the fractionator and return the exchanged energy to the bottom of the fractionator as reboiling means. This is possible because only a relatively small amount of compression-heating of the overhead vapors and/or expansion-cooling of the bottoms is required to produce a favorable temperature gradient for the desired heat exchange. Furthermore, the heat exchange is accompanied by concomitant changes of state of overhead material and of bottoms material, thereby resulting in a minimized entropy change which corresponds to increased efficiency. Now, in accordance with the present invention, this same type of energy economy is accomplished in more complex systems of integrated operations wherein the bottoms fraction from one step of the process may be expansion-cooled and used as refrigerating means for an overhead fraction from another step, the thus received thermal energy then being made available by compression for reboiling means in the step from which it was taken. Corresponding compression-heating of an overhead fraction from one step and heat exchange with a portion of a bottoms fraction from another step may be utilized. By such operations as will now be understood by one skilled in the art in view of the foregoing description of the invention, coordination of separate fractionation operations into completely integrated and advantageous processes are possible.

We claim as our invention:

1. A process of separating ethylene from a mixture comprising essentially only ethylene and ethane, which comprises separating the mixture in a fractionating zone into a vapor fraction rich in ethylene and poor in ethane and a liquid fraction rich in ethane and poor in ethylene, said vapor fraction being at a lower temperature than said liquid fraction, substantially adiabatically compressing the vapor fraction and raising its temperature above that of the liquid, simultaneously liquefying a portion of the vapor fraction and vaporizing at least a portion of the liquid fraction by heat exchange between said fractions, returning at least portions of the liquefied vapor fraction and of the vaporized liquid fraction separately and respectively to the upper and lower sections of the fractionating zone, and withdrawing unliquefied vapor fraction as substantially pure ethylene.

2. In a process of separating constituents A and B of a fluid mixture wherein A is only slightly more volatile than B, the steps comprising: subjecting the fluid mixture to fractional distillation in a fractionating zone, withdrawing an overhead vapor fraction rich in A and poor in B, withdrawing a bottoms liquid fraction rich in B and poor in A, compression-heating the overhead fraction to a temperature higher than that of the bottoms fraction, simultaneously at least partially vaporizing the bottoms fraction by absorption of heat from the compression-heated overhead fraction and at least partially liquefying said overhead fraction, returning at least a portion of the liquefied overhead fraction to an upper portion of the fractionating zone as reflux means, and returning at least a portion of the vaporized bottoms fraction to a lower section of the fractionating zone as heating means.

3. In a process of separating by fractional distillation constituents of a fluid mixture wherein a first constituent has a boiling temperature only slightly lower than that of a second constituent, the steps comprising: subjecting the fluid mixture to fractional distillation in a fractionating zone, separately withdrawing therefrom an overhead vapor fraction rich in the first constituent and a bottoms liquid fraction rich in the second constituent, compressing the overhead fraction and thereby heating it to a temperature above that of the withdrawn bottoms liquid, and supplying substantially the total heat for vaporizing the mixture within the fractionating zone by effecting heat transfer from the compression-heated overhead fraction to the bottoms fraction thereby vaporizing at least part of the bottoms liquid fraction and condensing at least part of the overhead vapor fraction, and returning at least a portion of the vaporized bottoms fraction to a lower portion of the fractionating zone as heating means.

4. A process of separating two constituents of a mixture thereof having a narrow boiling range, which comprises subjecting the mixture to fractionation in a distilling zone, withdrawing separately therefrom a vapor phase and a liquid phase, the vapor phase being at a slightly lower temperature than the liquid phase, substantially adiabatically compression-heating the vapor phase and transferring heat therefrom to the liquid phase, thereby at least partially condensing the vapor phase and partially vaporizing the liquid phase, separately withdrawing uncondensed vapor phase as substantially pure constituent having the lower boiling point and unvaporized liquid phase as substantially pure constituent having the higher boiling point, and returning condensed vapor phase and vaporized liquid phase to the distilling zone respectively as substantially the only reflux and heating means.

5. In a process of separating by fractionation constituents of a fluid mixture wherein there are first, second and third constituents with decreasing volatilities in the order named, the steps comprising: subjecting the fluid mixture to fractional distillation in a fractionating zone; withdrawing therefrom an overhead vapor fraction rich in the first, most volatile constituent; withdrawing from an intermediate portion of the fractionating zone an intermediate vapor fraction of said fluid enriched in the second constituent; withdrawing from the fractionating zone a bottoms fraction enriched in the third constituent; compressing the withdrawn intermediate vapor fraction under substantially adiabatic conditions to heat said fraction to a temperature above the temperature of said withdrawn bottoms fraction; effecting heat transfer from said compressed intermediate vapor fraction to at least a portion of said withdrawn bottoms fraction by bringing said fractions into heat exchange to condense at least a portion of said intermediate vapor fraction and to vaporize at least a portion of the bottoms fraction; returning at least a part of the resulting condensate of intermediate vapor fraction to the fractionating zone; and returning the resulting vaporized bottoms portion to a lower section of the fractionating zone as reboiling means.

6. In a process of separating by fractionation constituents of a fluid mixture wherein there are first, second and third constituents with decreasing volatilities in the order named, the steps comprising: subjecting the fluid mixture to fractional distillation in a fractionating zone; withdrawing therefrom an overhead vapor fraction rich in the first, most volatile constituent; withdrawing from an intermediate portion of the fractionating zone an intermediate vapor fraction of said fluid enriched in the second constituent; withdrawing from the fractionating zone a bottoms fraction enriched in the third constituent; expanding at least a portion of said bottoms fraction to produce a vaporized bottoms portion having a temperature below the temperature of said withdrawn intermediate vapor fraction, and a residual, cooled liquid bottoms fraction further enriched in the third constituent; effecting heat transfer from said withdrawn intermediate vapor fraction to said vaporized bottoms portion to condense at least part of said intermediate vapor fraction and thereafter returning at least a part of the resulting condensate to the fractionating zone; compressing the resulting heated vaporized bottoms portion and returning same to a lower section of the fractionating zone as reboiling means; and delivering a portion of the residual, cooled liquid bottoms portion to an upper section of the fractionating zone as absorbing means for the second constituent.

7. In a process of separating by fractionation constituents of a fluid mixture wherein there are first, second, third and fourth constituents with decreasing volatilities in the order named, the steps comprising: subjecting the fluid mixture to fractional distillation in a fractionating zone; withdrawing therefrom an overhead vapor fraction rich in the first, most volatile constituent; withdrawing from an intermediate portion of the fractionating zone an intermediate vapor fraction of said fluid enriched in the second constituent; withdrawing from the fractionating zone a bottoms fraction enriched in the third and the fourth constituents; expanding said bottoms fraction to produce a vaporized bottoms portion enriched in said third constituent and having a temperature below the temperature of said withdrawn intermediate vapor fraction, and a residual, cooled liquid fraction further enriched in the fourth constituent; effecting heat transfer from said withdrawn intermediate vapor fraction to said vaporized bottoms portion to condense at least part of said intermediate vapor fraction and thereafter returning at least a part of the condensate to the fractionating zone; compressing the resulting heated vaporized bottoms portion and returning same to a lower section of the fractionating zone as reboiling means; and delivering a portion of the residual, cooled liquid bottoms fraction to an upper section of the fractionating zone as absorbing means for the second constituent.

8. The process of separating substantially pure ethylene from a mixture comprising $C_1$—$C_4$ saturated and unsaturated hydrocarbons which comprises: subjecting the mixture to fractionation under superatmospheric pressure in a first fractionating zone; simultaneously withdrawing from the fractionating zone a top light fraction rich in methane, a bottom heavy fraction rich in $C_3$—$C_4$ hydrocarbons, and an intermediate medium fraction rich in $C_2$ hydrocarbons and poor in $C_1$ and $C_3$ hydrocarbons; separating the intermediate medium fraction into a vapor fraction comprising essentially ethylene and ethane and a liquid fraction enriched in $C_3$ hydrocarbons and returning the liquid fraction to the first fractionating zone; expanding at least a portion of the withdrawn bottom heavy fraction to vaporize at least a part of same and to reduce the temperature below that of the vapor fraction comprising ethylene-ethane obtained by vaporizing the intermediate medium fraction, transferring heat from said vapor fraction comprising ethylene-ethane to the expansion-cooled bottom heavy fraction to condense the ethylene and ethane in the vapors and to vaporize at least a portion of the unvaporized bottom heavy fraction; compression-heating the resulting vapors from the bottom heavy fraction and returning them to a lower portion of the first fractionating zone as heating means; separating uncondensed vapor from the resulting ethylene-ethane condensate; subjecting the resulting ethylene-ethane condensate to fractional separation in a second fractionating zone, simultaneously withdrawing therefrom an overhead vapor fraction rich in ethylene and poor in ethane and a bottoms liquid fraction rich in ethane and poor in ethylene, compression-heating the overhead ethylene fraction to a temperature above that of the bottoms fraction, transferring heat from the compression-heated overhead fraction to the bottoms liquid fraction to condense a portion of the overhead ethylene-rich fraction and to vaporize at least a portion of the ethane-rich bottoms liquid fraction, withdrawing the residual uncondensed overhead as substantially pure ethylene, and returning at least a portion of the resulting vaporized ethane-rich bottoms fraction to a lower portion of the second fractionating zone.

9. The process of separating substantially pure ethylene from a mixture comprising $C_1$—$C_4$ saturated and unsaturated hydrocarbons which comprises: simultaneously separating the mixture by fractional distillation under superatmospheric pressure into a $C_1$ fraction rich in methane, a $C_2$ fraction rich in ethane and ethylene, and a $C_3$—$C_4$ fraction; separating from the $C_2$ fraction a $C_2$ vapor fraction which contains substantially only ethane and ethylene and any more volatile substances present; expansion-cooling at least a portion of the $C_3$—$C_4$ fraction to a temperature below that of the $C_2$ vapor fraction and flowing the thus cooled portion $C_3$—$C_4$ fraction in heat-exchange with the $C_2$ vapor fraction to effect heat transfer and to at least partially condense the ethane and ethylene and to vaporize the said cooled portion of the $C_3$—$C_4$ fraction leaving an unvaporized portion thereof; separately expansion-cooling the said unvaporized portion of the $C_3$—$C_4$ fraction and separating from the resulting partially vaporized, further cooled $C_3$—$C_4$ fraction, a further cooled liquid portion, and delivering it to an upper portion of the zone of the fractional distillation; compression-heating and combining vapors from said resulting further cooled $C_3$—$C_4$ fraction with the $C_3$—$C_4$ vapors formed in the previous step; compression-heating the combined $C_3$—$C_4$ vapors and returning them to a lower portion of the zone of the fractional distillation; fractionally distilling the ethane-ethylene condensate in an ethane-ethylene distillation zone to produce an ethylene vapor fraction and an ethane liquid fraction; compression-heating the ethylene vapor fraction to a temperature higher than that of the ethane liquid fraction and flowing them in heat exchange to transfer heat from the ethylene to the ethane with at least condensation of the ethylene fraction, leaving substantially pure ethylene uncondensed, and at least partial vaporization of the ethane; returning resulting vaporized ethane to a lower section of the ethane-ethylene distillation zone and at least a portion of the resulting ethylene condensate to an upper portion of the same zone; and expansion-cooling another portion of one of the products from the ethane-ethylene distillation zone and thereby cooling it, and flowing the resultant cooled ethylene in heat exchange with a portion from the $C_3$—$C_4$ fraction to effect at least partial condensation thereof and returning the resultant condensate to the fractionating zone.

10. In a process of separating by fractionation a fluid mixture having a relatively narrow boiling range and which contains first, second and third constituents possessing decreasing volatilities in the order named, the steps comprising: subjecting the mixture to fractional distillation in a fractionation zone; withdrawing from the fractionation zone an overhead vapor fraction enriched in the first constituent and containing a portion of the second constituent; withdrawing from the fractionation zone a liquid bottoms fraction enriched in the third constituent and containing a portion of the second constituent; expanding the withdrawn bottoms fraction to produce a vaporized bottoms portion and a residual liquid bottoms portion; returning a first portion of the residual liquid bottoms portion to the fractionation zone; compressing and returning the vaporized bottoms portion to a lower section of the fractionation zone as reboiling and stripping means; flowing a second portion of the residual liquid bottoms portion in heat exchange with the withdrawn overhead vapor fraction to at least partially condense said overhead vapor fraction and to at least partially vaporize the second portion of the residual liquid bottoms portion; returning at least a part of the resulting condensate of overhead fraction to an upper section of the fractionation zone as reflux; and compressing and returning the resulting vaporized part of the second portion of the residual liquid bottoms portion to a lower section of the fractionation zone as reboiling means.

PHILIP HARVEY DEMING.
MALCOLM LEE SAGENKAHN.

REFERENCES CITED

The following references are of record in the file of this patent:

UNITED STATES PATENTS

| Number | Name | Date |
|---|---|---|
| 1,426,461 | Claude | Aug. 22, 1922 |
| 2,035,516 | Wilkinson et al. | Mar. 31, 1936 |
| 2,327,643 | Houghland | Aug. 24, 1943 |